(12) United States Patent
Annigeri et al.

(10) Patent No.: US 6,699,101 B2
(45) Date of Patent: Mar. 2, 2004

(54) METHOD FOR REMOVING A DAMAGED SUBSTRATE REGION BENEATH A COATING

(75) Inventors: Ravindra Annigeri, Simpsonville, SC (US); Warren A. Nelson, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 199 days.

(21) Appl. No.: 09/997,577

(22) Filed: Nov. 29, 2001

(65) Prior Publication Data

US 2003/0100242 A1 May 29, 2003

(51) Int. Cl.[7] ............................. B24B 49/00; B24B 51/00

(52) U.S. Cl. .................................. 451/5; 451/8; 451/54; 29/402.06; 29/402.08

(58) Field of Search ........................ 29/402.03, 402.04, 29/402.05, 402.06; 451/5, 8, 36, 38, 39, 40, 54, 57, 58; 340/680; 216/52

(56) References Cited

U.S. PATENT DOCUMENTS

| | | | | | |
|---|---|---|---|---|---|
| 4,534,823 | A | * | 8/1985 | Fishter et al. | 216/108 |
| 4,944,807 | A | * | 7/1990 | Sova | 134/3 |
| 5,248,381 | A | * | 9/1993 | Dunker et al. | 216/90 |
| 5,614,054 | A | * | 3/1997 | Reeves et al. | 156/344 |
| 5,695,659 | A | * | 12/1997 | Dickie | 216/48 |
| 5,851,409 | A | * | 12/1998 | Schaeffer et al. | 216/2 |
| 5,900,102 | A | * | 5/1999 | Reeves | 156/344 |
| 6,355,116 | B1 | * | 3/2002 | Chen et al. | 148/280 |
| 2003/0118440 | A1 | * | 6/2003 | Zhao et al. | 415/118 |

* cited by examiner

Primary Examiner—Timothy V. Eley

(57) ABSTRACT

A method of removing the damaged surface layer beneath a coating on a component. The method includes evaluating the component to assess the depth of the damaged substrate layer, followed by sensing a plurality of points over the outer surface of the component to determine a three-dimensional outer surface profile thereof. A three-dimensional grinding profile beneath the outer surface profile is then established based on the depth of the damaged substrate layer beneath the outer surface profile. The component is then ground along the grinding profile such that the damaged substrate layer is substantially removed without significantly removing an undamaged region of the substrate beneath the damaged substrate layer.

20 Claims, 1 Drawing Sheet

METHOD FOR REMOVING A DAMAGED SUBSTRATE REGION BENEATH A COATING

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

This invention generally relates to protective metallic coatings for components exposed to oxidizing environments, such as the hostile thermal environment of a gas turbine engine. More particularly, this invention is directed to a method for removing a damaged substrate region beneath an environmental coating or a bond coat for a thermal barrier coating (TBC)

(2) Description of the Related Art

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor and augmentor. A common solution is to protect the surfaces of such components with an environmental coating, i.e., a coating resistant to oxidation and hot corrosion. Overlay coatings are widely used as environmental coatings, particularly those of the MCrAlX type in which M is nickel, cobalt and/or iron and X is a reactive element such as yttrium, hafnium, or another rare earth or reactive element. When used in combination with a ceramic top coat, or thermal barrier coating (TBC), environmental coatings are referred to as bond coats. During high temperature exposure in air, an MCrAlX coating forms a protective aluminum oxide (alumina) scale that inhibits oxidation of the coating and the underlying substrate.

During long hours at elevated temperatures typical for gas turbine engines, there is considerable interaction between an environmental coating and its underlying superalloy substrate. This interaction results in interdiffusion of alloying elements present in the substrate and the environmental coating. A consequence of this interdiffusion is that the portion of the substrate immediately beneath the environmental coating undergoes changes in elemental concentrations, leading to degraded mechanical properties. As such, the substrate region beneath a coating in which interdiffusion occurs may be referred to as a damaged substrate layer.

Though significant advances have been made with environmental coating materials and processes for forming such coatings, there is the inevitable requirement to remove these coatings under certain circumstances. For example, removal may be necessitated by erosion or thermal degradation of the coating, refurbishment of the component on which the coating is formed, or an in-process repair of the coating or a thermal barrier coating (if present) adhered to the component by the coating. For the purpose of rejuvenating and reapplying an environmental coating, it is preferable to also remove the damaged substrate layer. Current state-of-the-art repair methods typically entail removal of the ceramic TBC (if present), such as by grit blasting technique, followed by a chemical stripping technique to remove the environmental coating. Typical stripping methods entail removing a metallic coating by electrochemical reaction between an electrolyte and the coating, which dissolves the coating.

Chemical stripping methods are often tailored for the particular chemistry of the coating, and as a result cannot be readily employed to remove a damaged substrate layer beneath an environmental coating, because of the extreme difficulty of controlling the composition of an electrolyte so that it will remove the damaged substrate layer and not the underlying undamaged portion of the substrate. If an excessive amount of undamaged substrate is removed, the consequence may be scrappage of the component as a result of excessive thinning of the substrate. The typical presence of compositional gradients in a damaged substrate layer also increases the difficulty of controlling the rate of damaged material removal, and may result in incomplete removal of the damaged layer. Further complicating the above are the typically complex geometries of gas turbine engine components, with the result that the removal of a damaged substrate layer is extremely difficult and time consuming.

In view of the above, it can be appreciated that existing repair processes do not ensure the removal of a damaged substrate layer formed as a result of substrate interdiffusion with an environmental coating. Therefore, it would be desirable if a method were available for removing a damaged substrate layer, particularly without significantly removing or damaging the underlying undamaged substrate. Such a process would preferably ensure that the damaged substrate layer is completely removed with a high degree of accuracy and within acceptable tolerance limits.

BRIEF SUMMARY OF THE INVENTION

The present invention generally provides a method of removing the damaged surface layer beneath a coating on a component, such as a superalloy turbine, combustor and augmenter component of a gas turbine engine. The method is intended for removing the damaged surface layer without excessive removal of undamaged portions of the underlying substrate, after which a new coating can be applied and the component rejuvenated. The present invention achieves these advantages with the use of an automated grinding method in combination with steps that enable the damaged substrate layer to be removed with a high degree of accuracy and reliably. A preferred grinding method is computer numerical controlled, which provides the added advantages of high repeatability and dimensional accuracy.

The process of this invention generally includes evaluating the component to assess the depth of the damaged substrate layer, followed by sensing a plurality of points over the outer surface of the component to determine a three-dimensional outer surface profile thereof. A three-dimensional grinding profile beneath the outer surface profile is then established based on the depth of the damaged substrate layer beneath the outer surface profile. The component is then ground along the grinding profile such that the damaged substrate layer is substantially removed without significantly removing the undamaged portion of the substrate beneath the damaged substrate layer. The resulting ground surface of the component is then sensed at locations corresponding to at least some of the plurality of points over the outer surface of the component to verify removal of the damaged substrate layer.

In view of the above, it can be appreciated that the present invention provides a processing methodology for removing a damaged substrate layer from a component protected by a coating, so that a new coating can be applied and the component rejuvenated. The invention makes use of an automated grinding operation and part-specific geometric data so that only a desired amount of material is removed from the component with a high degree of dimensional accuracy. According to a preferred aspect of the invention, components with complex shapes can be ground without compromising stringent dimensional tolerances, such as those required for advanced airfoil shapes. In addition, the grinding method of this invention can be automated to the extent that minimal operator intervention is required, and various complex shapes can be reproduced with very little manpower.

Other objects and advantages of this invention will be better appreciated from the following detailed description.

DETAILED DESCRIPTION OF THE INVENTION

The present invention is generally applicable to components that are protected with an overlay environmental coating as a result of being required to operate within a high-temperature environment. Notable examples of such components include the high and low pressure turbine vanes and blades of gas turbine engines. While the advantages of this invention are particularly applicable to superalloy airfoil components of gas turbine engines, the teachings of this invention are generally applicable to any component on which an environmental coating may be used to protect the component from its operating environment.

Figure 1:
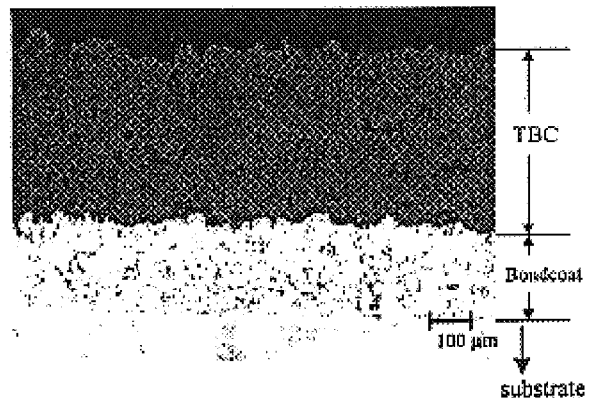
FIGS. 1 and 2 are cross-sectional views of an environmental coating on a superalloy component before and after exposure to a high temperature operating environment.
Figure 2:
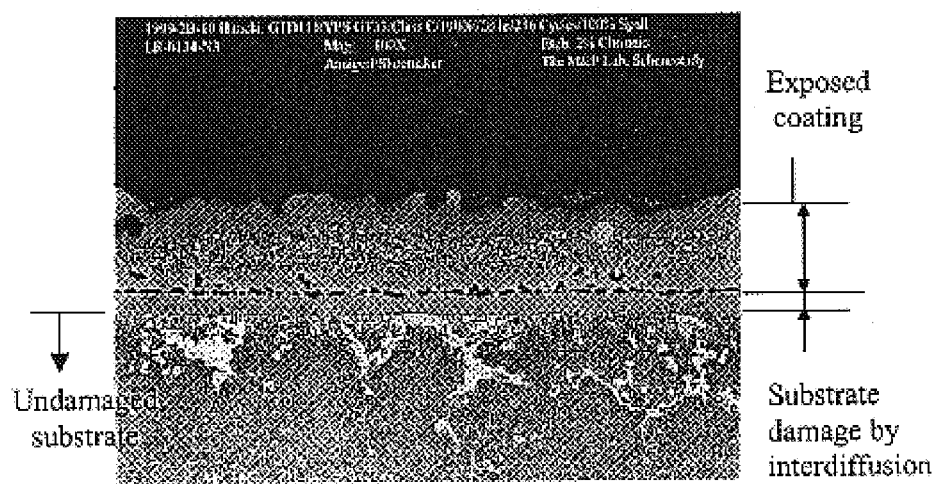

The method of this invention provides for the removal of a damaged substrate region beneath an overlay environmental coating on the surface of a component without removing the underlying undamaged portion of the component substrate. Particularly notable examples of overlay environmental coatings are of the MCrAlX type, which as known in the art undergo minimal interdiffusion with their underlying substrates when deposited. FIG. 1 is a microphotograph of a superalloy substrate protected by a plasma-sprayed ceramic TBC and an MCrAlX environmental coating (serving as a "bondcoat" for the TBC). From FIG. 1, one can appreciate that minimal interdiffusion has occurred between the environmental coating and the superalloy substrate. However, as seen in FIG. 2, when exposed to high temperatures for extended periods, considerable interdiffusion occurs by which elements of the coating diffuse into the substrate, and elements of the substrate diffuse into the coating. The result is a compositional grading that can significantly reduce the mechanical properties of the interdiffused region of the substrate, which can degrade the mechanical properties of the component.

According to the invention, the region of the substrate in which interdiffusion has occurred, referred to herein as a damaged substrate layer, is removed to allow for the application of a new environmental coating through a process by which the damaged substrate layer, and optionally the environmental coating and the ceramic TBC, is mechanically removed with an automated grinding process. Removal of the damaged substrate layer is preferably carried out using a computer numerical controlled (CNC) grinding operation, which can be of a type commercial available. The following describes a process by which the TBC and environmental coating are removed prior to removal of the damaged substrate layer, though it is within the scope of this invention to simultaneously remove the TBC and environmental coating along with the damaged substrate layer.

The initial step of carrying out the process of this invention generally entails inspecting a component to determine the extent of the damaged substrate layer. This step can be performed on the basis of expected damage for a given interval of operation, or by subjecting the component to a nondestructive evaluation (NDE) technique, or by subjecting another component that has been exposed to the same conditions to an NDE technique or a destructive metallographic evaluation. If the component is provided with a ceramic TBC, the TBC can be removed by grit blasting or another practice known in the art. The exposed environmental coating (the bond coat for the TBC) can then be removed using conventional chemical, electrochemical, or mechanical stripping techniques.

The component is then measured using a coordinate measurement machine (CMM) to generate a three-dimensional profile of the outer surface of the component. Alternatively, a touch probe can be mounted on the tool holder of a computer numerical control (CNC) machine so that probing and the subsequent grinding operation can be performed with the same fixturing by interchanging probes and tools on a single tool holder. A five or six-axis CNC machine of a type commercially available is preferred to reduce the number of fixturing setups and achieve the required motion for the grinding operation. The probe preferably locates multiple points on the outer surface of the component in machine coordinates, which can then be stored in Cartesian or another coordinate system in the memory of a computer connected to the probe controller. Preferably included in the probed locations are predefined "key points" in critical regions of the component, such as those locations where the substrate defines a relatively thin wall as a result of a cavity within the component. In any case, a sufficient number of points are probed to adequately define the desired three-dimensional outer profile of the component. Data taken from the touch probe is then utilized in a computer algorithm to calculate the extent of substrate damage in the particular component. The algorithm preferably accesses a database of the predicted substrate damage, i.e., the damage predicted based on the given interval of operation, or observed on the component or another component using an NDE or metallographic technique, as discussed above. Alternatively, the database could store data corresponding to a predefined amount of substrate damage targeted for removal for a particular component.

The profile of the component and the substrate damage data are then used as input to a second computer algorithm, which produces a part-specific grinding profile that is calculated to remove essentially the entire damaged substrate layer of the component. The component is fixtured in a CNC grinding machine (the same CNC machine if equipped with a probe to generate the outer profile of the component), and the grinding profile created by the computer is downloaded to the controller for the CNC grinding machine to establish a grinding tool path over the surface of the component. The CNC controller is preferably programed to automatically set up grinding parameters, such as speed, feed rate, etc., so that minimal operator intervention is required to perform the set-up. Grinding of the component is then initiated to remove the damaged substrate layer.

Suitable grinding tools include grinding wheels whose abrasive media are capable of removing the particular composition of the damaged substrate layer without excessive wheel wear, and that produce a suitable surface finish, e.g., about 125 micrometers Ra or less. A particular example of a suitable abrasive media is 100 to 1200 grit mesh of an abrasive material that can be of a commercially available type, such as silicon carbide, diamond, etc. The size and shape of the wheel are selected based upon the geometry of the component to be finished. Those skilled in the art will appreciate that abrasive particle size and concentration can be varied to strike a balance between surface finish and material removal rate. In addition, grinding wheels and belt wheels with various other grinding materials could be used as long as suitable material removal characteristics can be met.

Following removal of the damaged substrate layer, the coordinates of at least some of the predefined multiple points employed to generate the three-dimensional outer profile of the component, preferably including some of the key points, are then measured again to generate a ground profile for the component. This profile may then be compared with any available three-dimensional shape data for this component that was obtained prior to application of the environmental coating. Original wall thicknesses of the component can also be archived and accessed from this database. Measurement data of the ground profile and archived data for the component are then used by another computer algorithm to verify that the amount of damaged substrate removed from the component satisfies the following relationship for at least the key points of interest.

$$\text{Substrate Damage} \leq [(X_2-X_1)^2+(Y_2-Y_1)^2+(Z_2-Z_1)^2]^{1/2} \pm \sigma$$

where $(X_2, Y_2, Z_2)$ are coordinates of key points after the component was ground, $(X_1,Y_1,Z_1)$ are coordinates of key points before grinding, $\sigma$ is the one-standard deviation of the CNC grinding process or a predetermined acceptable tolerance, and "Substrate Damage" is the amount of material intended to be removed. If this equation is not satisfied for all key points of interest, the component is preferably refixtured in the CNC grinding machine and the process steps starting with the generation of the grinding profile are repeated until all of the damaged substrate layer that was originally identified is completely removed. Once the above equation is satisfied, the component can be forwarded for other processing, such as additional repairs, application of the environmental coating and TBC, etc.

As noted above, the process of this invention may be employed to simultaneously remove the environmental coating and optionally the TBC along with the damaged substrate layer. If such an approach is taken, the outer profile of the component is generated with the environmental coating and TBC present, and this profile and the substrate damage data initially collected are input to a computer algorithm to produce a part-specific grinding profile that is calculated to remove essentially the entire damaged substrate layer of the component, as well as the environmental coating and TBC.

A notable advantage of the above-described process is that it can be performed without removing the undamaged substrate beneath the damaged substrate layer. Instead, the process involves steps for accurately removing the damaged substrate layer using parameters that are unique for the particular component. While the invention has been described in terms of preferred embodiments, it is apparent that other forms could be adopted by one skilled in the art. Accordingly, the scope of the invention is to be limited only by the following claims.

What is claimed is:

1. A method for removing a damaged substrate layer that is present within a substrate region beneath an environmental coating on a surface of a component, the method comprising the steps of:

evaluating the component to assess the depth of the damaged substrate layer;

sensing a plurality of points over an outer surface of the component to determine a three-dimensional outer surface profile thereof;

establishing a three-dimensional grinding profile beneath the outer surface profile based on the depth of the damaged substrate layer beneath the outer surface profile;

grinding the component along the grinding profile such that the damaged substrate layer is substantially removed without significantly removing an undamaged region of the substrate beneath the damaged substrate layer, the grinding step generating a ground surface on the component; and then sensing the ground surface at locations corresponding to at least some of the plurality of points over the outer surface of the component to verify removal of the damaged substrate layer.

2. A method according to claim 1, wherein the environmental coating is an overlay coating that has partially interdiffused with the substrate to form the damaged substrate layer.

3. A method according to claim 2, wherein the overlay coating and the substrate are metallic materials.

4. A method according to claim 1, further comprising the step of removing the environmental coating by a chemical stripping process prior to removing the damaged substrate layer.

5. A method according to claim 1, wherein the environmental coating is simultaneously removed with the damaged substrate layer during the grinding step.

6. A method according to claim 1, wherein the step of sensing the ground surface includes determining a wall thickness defined between the ground surface and a cavity within the component.

7. A method according to claim 1, wherein the step of establishing the grinding profile is performed with a computer that quantifies the damaged substrate region for the component.

8. A method according to claim 7, wherein the grinding step is performed with a computer numerical controlled grinding machine, and the grinding profile is input into the computer numerical controlled grinding machine from the computer.

9. A method according to claim 1, wherein the component further comprises a thermal barrier coating overlying the environmental coating, the method further comprising the step of removing the thermal barrier coating prior to removing the environmental coating and the damaged substrate layer.

10. A method according to claim 1, wherein the component further comprises a thermal barrier coating overlying the environmental coating, the method further comprising the step of removing the thermal barrier coating simultaneously with the environmental coating and the damaged substrate layer during the grinding step.

11. A method according to claim 1, wherein the environmental coating has a composition of MCrAlX where M is nickel, cobalt and/or iron and X is a rare earth or reactive element.

12. A method according to claim 1, wherein the component is a gas turbine engine component.

13. A method for removing a damaged substrate layer beneath an overlay environmental coating on a superalloy substrate of a gas turbine engine component, the environmental coating having a composition of MCrAlX where M is nickel, cobalt and/or iron and X is a rare earth or reactive element, the environmental coating being partially interdiffused with the substrate to form the damaged substrate layer, the method comprising the steps of:

evaluating the component to assess the depth of the damaged substrate layer;

sensing a plurality of points over an outer surface of the component to determine a three-dimensional outer surface profile thereof;

with a computer, establishing a three-dimensional grinding profile beneath the outer surface profile based on the depth of the damaged substrate layer beneath the outer surface profile;

inputting the grinding profile into a computer numerical controlled grinding machine;

grinding the component with the computer numerical controlled grinding machine along the grinding profile such that the damaged substrate layer is substantially removed without significantly removing an undamaged region of the substrate beneath the damaged substrate layer, the grinding step generating a ground surface on the component; and then sensing the ground surface at locations corresponding to at least some of the plurality of points over the outer surface of the component to verify removal of the damaged substrate layer.

14. A method according to claim 13, further comprising the step of removing the environmental coating by a chemical stripping process prior to removing the damaged substrate layer.

15. A method according to claim 13, wherein the environmental coating is simultaneously removed with the damaged substrate layer during the grinding step.

16. A method according to claim 13, wherein the step of sensing the ground surface includes determining a wall thickness defined between the ground surface and a cavity within the component.

17. A method according to claim 13, wherein the step of establishing the grinding profile includes quantifying the damaged substrate region of the component with the computer.

18. A method according to claim 13, wherein the component further comprises a thermal barrier coating overlying the environmental coating, the method further comprising the step of removing the thermal barrier coating prior to removing the environmental coating and the damaged substrate layer.

19. A method according to claim 13, wherein the component further comprises a thermal barrier coating overlying the environmental coating, the method further comprising the step of removing the thermal barrier coating simultaneously with the environmental coating and the damaged substrate layer during the grinding step.

20. A method according to claim 13, wherein the component is an airfoil component of a gas turbine engine.

* * * * *